Patented Aug. 18, 1953

2,649,426

UNITED STATES PATENT OFFICE 2,649,426

SOLUTIONS OF VINYLIDENE CYANIDE INTERPOLYMERS IN AN ORGANIC NITRILE

Harry Gilbert, Cuyahoga Falls, and Floyd F. Miller, Wadsworth, Ohio, assignors to The B. F. Goodrich Company, New York, N. Y., a corporation of New York No Drawing. Application May 17, 1952, Serial No. 288,561

11 Claims. (Cl. 260—32.4)

This invention relates to novel polymer solutions, and pertains more particularly to solutions of certain vinylidene cyanide interpolymers in certain organic nitriles, especially acetonitrile.

U. S. Patents 2,476,270, 2,502,412 and 2,514,387 disclose novel methods for the preparation of monomeric vinylidene cyanide, which is a clear liquid at room temperature and a crystalline solid at 0° C., possessing a melting point when in purest form of about 9.7° C., and which undergoes on contact with water an instantaneous homopolymerization reaction to give a solid water-insoluble resin. On copolymerization of this monomer in mass or in anhydrous organic medium with various other polymerizable materials there are obtained interpolymers which are extremely useful in the preparation of filaments, films and shaped articles possessing many valuable properties including high tensile strengths, low elongation and excellent resistance to the action of chemicals and the weather.

Many interpolymers of vinylidene cyanide with other monoolefinic monomers are particularly unique and useful in that they possess the unusual 1:1 alternating structure, that is, they possess essentially the structure

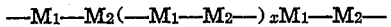

wherein each M₁ is a vinylidene cyanide unit of the structure

each M₂ is a unit of the monoolefinic comonomer polymerized with the vinylidene cyanide, and $x$ is a number, preferably in excess of 100. Analysis of such interpolymers shows that they contain 50 mole per cent ±5 mole per cent of vinylidene cyanide units regardless of the degree of monomer to polymer conversion, and hence they are essentially 50 mole per cent alternating interpolymers.

It has been found, however, that many economical solvents ordinarily employed to dissolve more conventional polymeric materials do not possess sufficient solvent power to dissolve such alternating vinylidene cyanide interpolymers. Moreover the few known solvents for such interpolymers are quite expensive and/or not available in commercial quantities.

Accordingly it is an object of this invention to provide economical and commercially available materials which possess a high degree of solvent power for essentially 50 mole per cent alternating vinylidene cyanide interpolymers. Another object is to provide colorless, stable solutions of such vinylidene cyanide interpolymers which solutions possess a viscosity such that they are highly suitable for use in the preparation of shaped articles, as in the spinning of fibers and the casting of films. Other objects of the invention will be apparent from the description which follows.

It has now been discovered that the above and other objects are readily attained by dissolving such vinylidene cyanide interpolymers in certain organic nitriles which possess the structure RCN, wherein R is a hydrocarbon radical or chlorine-substituted hydrocarbon radical containing from 1 to 7 carbon atoms and in which any unsaturation is present in a benzene ring. Such organic nitriles may be utilized alone, or with other compatible solvents for vinylidene cyanide interpolymers, or they may even be used in combination with equal or lesser amounts of other organic solvents compatible therewith such as dioxane, acetone, and the like, which are in themselves non-solvents for vinylidene cyanide copolymers under normal conditions of temperature and pressure. The resulting solutions, especially those containing from about 8 to 30% of vinylidene cyanide interpolymer are clear and viscous, and remain so on storage, and are extremely valuable in the spinning of fibers and the casting of films.

The organic nitriles which possess the structure RCN, wherein R has the same significance as above, and which are useful solvents for vinylidene cyanide interpolymers include acetonitrile, propionitrile, butyronitrile, isobutyronitrile, phenylacetonitrile, benzonitrile and the chlorine-substituted derivatives thereof such as chloro-acetonitrile, beta-chloro-propionitrile, 2,4-dichlorophenylacetonitrile and the like. Acetonitrile, which is economically available in commercial quantities, is an especially preferred solvent for vinylidene cyanide interpolymers. Mixtures of acetonitrile with equal amounts of dioxane, which itself is a non-solvent, are also especially useful as are mixtures of acetonitrile with other solvents for vinylidene cyanide interpolymers such as dimethyl formamide and nitromethane.

The vinylidene cyanide interpolymers which form useful spinning and casting solutions in organic nitriles according to this invention include any interpolymer of vinylidene cyanide with one or more monoolefinic monomers co-polymerizable therewith provided that the interpolymer contains from 45 to 55 mole per cent of vinylidene cyanide units. In a polymer of such vinylidene cyanide content the nature of the remaining units, derived from monoolefinic monomer, is not critical. However, in order to obtain such an interpolymer it is preferable to employ in the interpolymerization at least one monoolefinic monomer which copolymerizes with vinylidene cyanide to form an essentially 1 to 1 (or 50 mole per cent) alternating copolymer.

Among the polymerizable monoolefinic compounds which form the essentially 1:1 alternating copolymers with vinylidene cyanide are included, by way of example, the following classes of compounds:

(1) Vinyl esters of aliphatic monocarboxylic acids, preferably of the structure RCOOH, wherein R is alkyl, such as vinyl acetate, vinyl propionate, vinyl butyrate, vinyl isobutyrate, vinyl valerate, vinyl caproate, vinyl enanthate and the like. The copolymerization with vinylidene cyanide of such copolymerizable monomers and the resulting copolymers are described more fully in copending application, Serial No. 115,562, filed September 13, 1949, now Patent Number 2,615,866. Solutions of these two-component copolymers in organic nitriles form a particularly preferred class of compositions within the scope of this invention;

(2) Vinyl esters of the structure

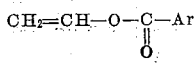

wherein Ar is an aromatic radical in which all the hydrogen atoms are attached to carbon atoms, such as vinyl benzoate; homologs of vinyl benzoate of the formula

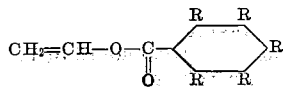

wherein each R is a member of the class consisting of hydrogen atoms or lower alkyl radicals, for example, vinyl toluate and the like; monomers of the above general class wherein the aromatic radical is halogen substituted, such as vinyl p-chlorobenzoate, vinyl o-chlorobenzoate, vinyl m-chlorobenzoate, and similar vinyl halobenzoates and monomers of the above general class wherein the aromatic radical is alkoxy substituted, for example, vinyl p-methoxybenzoate, vinyl o-methoxybenzoate and vinyl p-ethoxybenzoate. The copolymerization with vinylidene cyanide, of such monomers, and the resulting copolymers are disclosed in copending application, Serial No. 115,563, filed September 13, 1949, now Patent Number 2,615,867;

(3) Styrene and substituted styrenes of the general formula

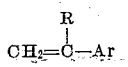

wherein Ar is an aromatic radical in which all of the hydrogen atoms are attached to carbon atoms and R is a member of the class consisting of hydrogen atoms and alkyl radicals, preferably those which contain from 1 to 4 carbon atoms, such as styrene itself, and substituted styrenes such as alpha-methyl styrene, alpha-ethyl styrene, alpha-butyl styrene, alpha-chlorostyrene, alpha-bromostyrene, 2,5-dichlorostyrene, 2,5-dibromostyrene, ortho-, meta-, and para-methoxystyrene, para-alpha-dimethyl styrene, para-methyl styrene, 3,4-dichlorostyrene, 3,4-difluorostyrene, 2,4-dichlorostyrene, 2,4,5-trichlorostyrene, dichloro-monofluorostyrenes and the like. Copolymerization of vinylidene cyanide with styrene and substituted styrenes is disclosed in copending application, Serial No. 115,564, filed September 13, 1949, now Patent Number 2,615,868;

(4) Olefins of the general structure

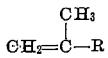

wherein R is an alkyl radical, preferably containing from 1 to 6 carbon atoms, such as isobutylene, (2-methyl propene-1), 2-methylbutene-1, 2-methylpentene-1, 2,3-dimethylbutene-1, 2,3-dimethylpentene-1, 2,3,3-trimethylbutene-1, 2,3,4-trimethylpentene-1, 2,6-dimethyloctene-1, 2-methylnonadecene-1, and the like. Copolymerization of such olefins with vinylidene cyanide is disclosed in copending application, Serial No. 115,561, filed September 13, 1949, now Patent Number 2,615,865;

(5) Alkyl esters of methacrylic acid which possess the structure

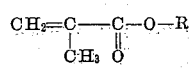

wherein R is an alkyl radical, preferably containing from 1 to 8 carbon atoms, for example, methyl methacrylate, ethyl methacrylate, propyl methacrylate, butyl methacrylate, amyl methacrylate, hexyl methacrylate, heptyl methacrylate, octyl methacrylate, decyl methacrylate, and the like. Vinylidene cyanide/alkyl methacrylate copolymers and their preparation are disclosed in copending application, Serial No. 144,198, filed February 14, 1950, now Patent Number 2,615,871;

(6) 2-halogenated monoolefins of the structure

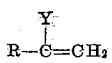

wherein R is a lower alkyl radical such as methyl, ethyl, propyl or butyl, and Y is a halogen atom, such as 2-chloropropene, 2-chlorobutene, 2-chloropentene, 2-chlorohexene, 2-chloroheptene, 2-bromobutene, 2-bromoheptene, 2-fluorohexene, 2-fluorobutene, 2-iodopropene, 2-iodopentene, and the like. Copolymerization of these compounds with vinylidene cyanide is disclosed in copending application, Serial No. 181,588, filed August 25, 1950, now Patent Number 2,615,877;

(7) Isopropenyl esters of organic monocarboxylic acids, preferably of the formula RCOOH, wherein R is an alkyl radical containing from 1 to 6 carbon atoms, and including isopropenyl acetate, isopropenyl propionate, isopropenyl isobutylrate, isopropenyl valerate, isopropenyl caproate, and isopropenyl enanthate; as well as isopropenyl esters of aromatic carboxylic acids, for example, isopropenyl benzoate, isopropenyl p-chlorobenzoate, isopropenyl o-chlorobenzoate, isopropenyl m-chlorobenzoate, isopropenyl toluate, isopropenyl alpha-chloroacetate, isopropenyl alpha-bromo-propionate, and the like; the copolymerization of all of which with vinylidene cyanide is described in copending application Serial No. 181,571, filed August 25, 1950, now Patent Number 2,615,875;

(8) Vinyl esters of alpha-halo saturated aliphatic monocarboxylic acids of the structure

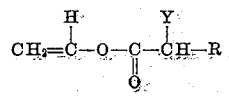

wherein R is a member of the class consisting of hydrogen and an alkyl radical, preferably a lower alkyl radical, and Y is a halogen atom, such as vinyl alpha-chloroacetate, vinyl alpha-bromoacetate, vinyl alpha-chloropropionate, vinyl alpha-bromopropionate, vinyl alpha-iodopropionate, vinyl alpha-bromovalerate and the like. The copolymerization of such monomers with vinylidene cyanide is described in copending application, Serial No. 181,572, filed August 25, 1950, now Patent Number 2,615,876;

(9) Vinyl halides such as vinyl chloride, vinyl bromide and the like, which are copolymerized with vinylidene cyanide as described in copending application, Serial No. 144,196, filed February 14, 1950, now Patent Number 2,615,869.

In addition to solutions containing the two-component interpolymers of vinylidene cyanide containing the essentially 1 to 1 molar alternating structure and essentially 50 mole per cent vinylidene cyanide units, such as those disclosed in the copending applications referred to above, solutions of other vinylidene cyanide interpolymers containing from 45 to 55% vinylidene cyanide are also within the scope of this invention. For example, there are included interpolymers, of this vinylidene cyanide content, made from vinylidene cyanide and more than one copolymerizable monoolefinic compound, a large number of which interpolymers are disclosed in copending application Serial No. 268,463, filed January 26, 1952, the disclosure of which is incorporated herein by reference. Such interpolymers are prepared by polymerizing vinylidene cyanide with at least two other monoolefinic compounds, at least one of which forms an essentially 1:1 alternating two-component copolymer when polymerized with vinylidene cyanide. Examples of these interpolymers include vinylidene cyanide, vinyl acetate and vinyl chloride; vinylidene cyanide, vinyl acetate and styrene; vinylidene cyanide, vinyl acetate and methyl methacrylate; and the like.

It is thus apparent that this invention contemplates the use of a generic class of interpolymers of vinylidene cyanide with a copolymerizable monoolefinic compound, which interpolymers contain from about 45 to 55 mole per cent of vinylidene cyanide units, and that the nature of the remaining units is not critical.

The solutions of vinylidene cyanide interpolymers in organic nitriles of this invention are prepared by the methods ordinarily employed in dissolving high polymers. For example, solution may be accomplished simply by placing the polymer, which is generally in the form of a white powder of small particle size, in the solvent, and agitating the mixture until solution is complete. It is also desirable that the polymer solvent mixture be heated slightly, for example at about 40° C. to 80° C., since solution of the polymer is thereby facilitated. In preparing large quantities of polymer solutions, a desirable expedient consists in first cooling the organic nitrile to a temperature at which its solvent power is considerably lowered, adding the polymer while strongly agitating the liquid so that the polymer particles are dispersed in the cooled solvent and then heating the dispersion whereupon the dispersed particles dissolve. By utilizing this method lumping or agglomeration is prevented and solution of the polymer is obtained much more readily.

Solutions having any desired polymer concentration may be prepared since the solvent and polymer utilized in this invention are compatible with one another regardless of precise proportions of each. However, the solvent is generally in considerable excess, to secure a liquid solution, and solutions containing from about 5 to 30 or 40% of polymer are preferred for spinning into fibers or casting into films.

The following examples are intended to illustrate more fully the use of organic nitriles and mixtures of organic nitriles with other substances as solvents for vinylidene cyanide interpolymers, but are not intended to limit the scope of the invention, for it is, of course, possible to effect many modifications therein. In the examples all parts are by weight.

*Example I*

300 parts of a 1 to 1 alternating vinylidene cyanide/vinyl acetate copolymer having an intrinsic viscosity of 1.84 are dissolved in 1004 parts of acetonitrile to give a solution containing 23% solids. The resulting solution is spun through a multiholed spinneret to give a strong, white yarn.

*Example II*

A solution containing 21% solids is prepared by dissolving 200 parts of a vinylidene cyanide/vinyl acetate 1 to 1 alterating copolymer in 750 parts of acetonitrile. The copolymer possesses an intrinsic viscosity of 2.7. The solution thus prepared is spun as in Example I to give a strong, silky yarn.

*Example III*

0.1 part of a very high molecular weight, 1 to 1 alternating, vinylidene cyanide/vinyl acetate copolymer having an intrinsic viscosity of 4.0 is added to 10 parts of propionitrile. The mixture is then heated to the boiling point of the propionitrile whereupon a clear, viscous solution, useful as a spinning solution, is obtained.

*Examples IV and V*

Example III is twice repeated except that phenylacetonitrile and beta-chloro propionitrile, respectively, are substituted for the propionitrile. On gentle warming of the mixtures, the copolymer dissolves and clear, viscous solutions are obtained.

*Examples VI to IX*

1.0 part of the high molecular weight vinylidene cyanide/vinyl acetate copolymer of Example III is dissolved in 10 parts of each of the following solvent mixtures, which mixtures contain equal amounts of each of the two components:

a. Acetonitrile and dioxane
b. Acetonitrile and acetone
c. Propionitrile and dioxane
d. Propionitrile and acetone Clear, viscous solutions suitable as spinning or casting solutions are obtained with each of the above listed solvent combinations.

*Examples X to XV*

1.0 part of a 1 to 1 alternating copolymer of vinylidene cyanide with each of propylene, methyl methacrylate, styrene, isobutylene, vinyl chloride, and vinyl benzoate is admixed with 10 parts of acetonitrile. The mixtures are gently warmed whereupon clear, viscous solutions form from which excellent filaments are spun.

*Example XVI*

5 parts of a tripolymer of vinylidene cyanide, vinyl acetate and 2-chloropropene containing about 50 mole per cent of vinylidene cyanide units, are added to 100 parts of acetonitrile maintained at room temperature. A clear, viscous solution from which filaments can be spun is obtained.

*Example XVII*

Example XV is repeated utilizing a tripolymer of vinylidene cyanide, methyl methacrylate and 2-chloropropene. The resulting solution is then spun into filaments which are substantially unaffected by acids, alkalis or the weather.

Although specific examples of the invention have been herein described, it is not intended to limit the invention solely thereto, but to include all of the variations and modifications falling within the spirit and scope of the appended claims.

We claim:

1. A composition comprising an interpolymer of vinylidene cyanide with at least one other monoolefinic monomer, said interpolymer containing from about 45 to 55 mole per cent of vinylidene cyanide units, and, as a solvent therefor, a compound of the structure RCN, wherein R is a member of the class consisting of hydrocarbon radicals and chloride substituted hydrocarbon radicals, each containing from 1 to 7 carbon atoms and in which any unsaturation is present in a benzene ring.

2. A composition comprising a two-component 1 to 1 molar alternating copolymer of vinylidene cyanide with a monoolefinic monomer, and, as a solvent therefor, a compound of the structure RCN, wherein R is a member of the class consisting of hydrocarbon radicals and chlorine-substituted hydrocarbon radicals, each containing from 1 to 7 carbon atoms and in which any unsaturation is present in a benzene ring.

3. A composition comprising a two-component 1 to 1 molar alternating copolymer of vinylidene cyanide with a monoolefinic monomer, said copolymer being dissolved in a solvent comprising a compound of the structure RCN, wherein R is an alkyl radical containing from 1 to 7 carbon atoms.

4. The composition of claim 3 wherein the compound of the structure RCN is acetonitrile.

5. A composition comprising a 1 to 1 molar alternating copolymer of vinylidene cyanide with a vinyl ester of an aliphatic monocarboxylic acid, said copolymer being dissolved in a compound of the structure RCN wherein R is an alkyl radical containing from 1 to 7 carbon atoms.

6. A composition comprising a 1 to 1 molar alternating copolymer of vinylidene cyanide with vinyl acetate, said copolymer being dissolved in a solvent comprising a compound of the structure RCN, wherein R is an alkyl radical containing from 1 to 7 carbon atoms.

7. The composition of claim 6 wherein the compound of the structure RCN is acetonitrile.

8. A composition comprising an interpolymer of vinylidene cyanide with at least two other monoolefinic monomers, at least one of which forms an essentially 1:1 alternating two-component polymer when polymerized with vinylidene cyanide, said interpolymer containing from about 45 to 55 mole percent of vinylidene cyanide units, and as a solvent therefor a compound of the structure RCN, wherein R is a member of the class consisting of hydrocarbon radicals and chlorine-substituted hydrocarbon radicals, each containing from 1 to 7 carbon atoms and in which any unsaturation is present in a benzene ring.

9. A composition comprising an interpolymer of vinylidene cyanide with at least two other monoolefinic monomers, at least one of which forms an essentially 1:1 alternating two-component polymer when polymerized with vinylidene cyanide, said interpolymer containing from about 45 to 55 mole percent of vinylidene cyanide units, said interpolymer being dissolved in a solvent comprising a compound of the structure RCN, wherein R is an alkyl radical containing from 1 to 7 carbon atoms.

10. The composition of claim 9 wherein the interpolymer comprises vinylidene cyanide, vinyl acetate and one other monoolefinic monomer copolymerizable therewith.

11. The composition of claim 9 wherein the compound of the structure RCN is acetonitrile.

HARRY GILBERT.
FLOYD F. MILLER.

No references cited.